(12) United States Patent
Han et al.

(10) Patent No.: US 8,611,695 B1
(45) Date of Patent: Dec. 17, 2013

(54) LARGE SCALE PATCH SEARCH

(75) Inventors: Mei Han, Cupertino, CA (US); Vivek Kwatra, Santa Clara, CA (US); Hui Fang, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 897 days.

(21) Appl. No.: 12/430,791

(22) Filed: Apr. 27, 2009

(51) Int. Cl.
*G06K 9/36* (2006.01)

(52) U.S. Cl.
USPC ............ 382/284; 382/254; 382/305; 707/705

(58) Field of Classification Search
USPC .................................................. 382/284, 305
See application file for complete search history.

(56) References Cited

U.S. PATENT DOCUMENTS

| | | | |
|---|---|---|---|
| 5,003,618 A | 3/1991 | Meno | |
| 5,081,656 A | 1/1992 | Baker et al. | |
| 5,325,449 A | 6/1994 | Burt et al. | |
| 5,488,674 A | 1/1996 | Burt et al. | |
| 5,497,430 A | 3/1996 | Sadovnik et al. | |
| 5,761,329 A | 6/1998 | Chen et al. | |
| 5,963,670 A * | 10/1999 | Lipson et al. | 382/224 |
| 6,005,247 A | 12/1999 | Baum | |
| 6,201,541 B1 | 3/2001 | Shalom et al. | |
| 6,240,423 B1 | 5/2001 | Hirata | |
| 6,249,616 B1 * | 6/2001 | Hashimoto | 382/284 |
| 6,253,173 B1 | 6/2001 | Ma | |
| 6,459,821 B1 | 10/2002 | Cullen | |
| 6,463,426 B1 * | 10/2002 | Lipson et al. | 1/1 |
| 6,466,694 B2 | 10/2002 | Kamada et al. | |
| 6,516,085 B1 | 2/2003 | Wiley et al. | |
| 6,535,650 B1 | 3/2003 | Poulo et al. | |
| 6,587,581 B1 | 7/2003 | Matsuyama et al. | |
| 6,674,890 B2 | 1/2004 | Maeda et al. | |
| 6,675,174 B1 * | 1/2004 | Bolle et al. | 1/1 |
| 6,681,056 B1 | 1/2004 | Tseng et al. | |
| 6,683,984 B1 | 1/2004 | Lesser et al. | |
| 6,701,026 B1 | 3/2004 | Zheng et al. | |
| 6,762,769 B2 * | 7/2004 | Guo et al. | 345/582 |
| 6,826,300 B2 * | 11/2004 | Liu et al. | 382/159 |
| 6,898,331 B2 | 5/2005 | Tiana | |
| 7,006,671 B2 * | 2/2006 | Yamaguchi | 382/115 |
| 7,120,626 B2 * | 10/2006 | Li et al. | 1/1 |

(Continued)

OTHER PUBLICATIONS

Rahman, M. et al., "A Feature Level Fusion in Similarity Matching to Content-Based Image Retrieval", 2006, Information Fusion, 2006 9th International Conference on, p. 1-6.*

(Continued)

*Primary Examiner* — Claire X Wang
*Assistant Examiner* — Gandhi Thirugnanam
(74) *Attorney, Agent, or Firm* — Fenwick & West LLP

(57) ABSTRACT

An image processing server enhances an original image using image data from other images. The server generates global descriptors of a set of received images and creates an image data structure therefrom. The server also identifies a set of patches for each of the received images, generates descriptors of the patches, and generates a patch data structure therefrom. The image processing system identifies a patch in an original image for which enhancement is desired. The image processing server uses a global descriptor of the original image to search the image data structure for a set of related images that are visually similar to the original image. The image processing server uses a patch descriptor of the patch for which enhancement is desired to search the patch data structures for the related images to identify a set of patches that are visually similar to the patch in the original image.

18 Claims, 7 Drawing Sheets

(56) References Cited

U.S. PATENT DOCUMENTS

| | | | |
|---|---|---|---|
| 7,315,642 | B2 | 1/2008 | Bartov |
| 7,358,994 | B2* | 4/2008 | Yano .......................... 348/254 |
| 7,366,323 | B1 | 4/2008 | Yao |
| 7,376,251 | B2 | 5/2008 | Stober |
| 7,388,979 | B2 | 6/2008 | Sakai et al. |
| 7,447,338 | B2 | 11/2008 | Kim |
| 7,577,313 | B1 | 8/2009 | Georgiev |
| 7,668,787 | B2 | 2/2010 | Bier |
| 7,697,746 | B2 | 4/2010 | Kawaguchi |
| 7,706,603 | B2* | 4/2010 | Najafi et al. ................. 382/154 |
| 7,724,960 | B1* | 5/2010 | Mikhael et al. .............. 382/190 |
| 7,734,097 | B1* | 6/2010 | Porikli et al. ................ 382/190 |
| 7,778,488 | B2 | 8/2010 | Nord et al. |
| 7,783,102 | B2 | 8/2010 | Kawaragi |
| 7,941,004 | B2* | 5/2011 | Zhu et al. ..................... 382/299 |
| 7,957,565 | B1 | 6/2011 | Sharma et al. |
| 8,001,157 | B2 | 8/2011 | Bier |
| 8,005,292 | B2 | 8/2011 | Sakai et al. |
| 8,023,742 | B2* | 9/2011 | Brown et al. ................ 382/195 |
| 8,090,429 | B2 | 1/2012 | Vija et al. |
| 8,103,090 | B2* | 1/2012 | Ma et al. ..................... 382/155 |
| 8,131,786 | B1 | 3/2012 | Bengio et al. |
| 8,175,376 | B2* | 5/2012 | Marchesotti et al. ........ 382/159 |
| 8,321,422 | B1 | 11/2012 | Kwatra |
| 8,391,634 | B1 | 3/2013 | Kwatra et al. |
| 8,396,325 | B1* | 3/2013 | Kwatra et al. ............... 382/284 |
| 2001/0055429 | A1 | 12/2001 | Hirosawa et al. |
| 2003/0016881 | A1 | 1/2003 | Matsuura |
| 2003/0142860 | A1 | 7/2003 | Glasser et al. |
| 2003/0169906 | A1 | 9/2003 | Gokturk et al. |
| 2003/0190090 | A1 | 10/2003 | Beeman et al. |
| 2004/0032979 | A1 | 2/2004 | Honda et al. |
| 2004/0139067 | A1* | 7/2004 | Houle ............................. 707/3 |
| 2004/0169658 | A1 | 9/2004 | Shin et al. |
| 2005/0100209 | A1* | 5/2005 | Lewis et al. ................. 382/159 |
| 2005/0149494 | A1* | 7/2005 | Lindh et al. ..................... 707/3 |
| 2005/0163397 | A1 | 7/2005 | Baldwin |
| 2005/0179910 | A1 | 8/2005 | Bartov |
| 2005/0238198 | A1* | 10/2005 | Brown et al. ................ 382/103 |
| 2006/0017739 | A1* | 1/2006 | Fang et al. ................... 345/582 |
| 2006/0023944 | A1* | 2/2006 | Oisel et al. .................. 382/171 |
| 2006/0034540 | A1 | 2/2006 | Zavadsky et al. |
| 2006/0215882 | A1 | 9/2006 | Ando et al. |
| 2006/0233423 | A1* | 10/2006 | Najafi et al. ................. 382/103 |
| 2006/0244757 | A1 | 11/2006 | Fang et al. |
| 2007/0050411 | A1* | 3/2007 | Hull et al. .................. 707/104.1 |
| 2007/0104389 | A1 | 5/2007 | Wells |
| 2007/0140556 | A1* | 6/2007 | Willamowski et al. ....... 382/167 |
| 2007/0183629 | A1 | 8/2007 | Porikli et al. |
| 2007/0269107 | A1* | 11/2007 | Iwai et al. .................... 382/168 |
| 2007/0280556 | A1 | 12/2007 | Mullick et al. |
| 2007/0282935 | A1 | 12/2007 | Khan et al. |
| 2007/0286523 | A1 | 12/2007 | Kim et al. |
| 2007/0297653 | A1* | 12/2007 | Bolle et al. ................... 382/124 |
| 2008/0025635 | A1 | 1/2008 | Han et al. |
| 2008/0063238 | A1 | 3/2008 | Wiedemann et al. |
| 2008/0118151 | A1* | 5/2008 | Bouguet et al. .............. 382/181 |
| 2008/0118160 | A1* | 5/2008 | Fan et al. ..................... 382/225 |
| 2008/0130960 | A1* | 6/2008 | Yagnik ........................ 382/118 |
| 2008/0235216 | A1* | 9/2008 | Ruttenberg ....................... 707/5 |
| 2008/0260274 | A1* | 10/2008 | Winder et al. ................ 382/248 |
| 2009/0003725 | A1 | 1/2009 | Merkel et al. |
| 2009/0208106 | A1* | 8/2009 | Dunlop et al. ............... 382/173 |
| 2009/0252428 | A1* | 10/2009 | Winder ........................ 382/253 |
| 2009/0274385 | A1* | 11/2009 | Zhu et al. ..................... 382/264 |
| 2010/0008581 | A1* | 1/2010 | Bressan ........................ 382/177 |
| 2010/0013965 | A1 | 1/2010 | Pugh et al. |
| 2010/0026888 | A1 | 2/2010 | Pearlstein et al. |
| 2010/0040285 | A1* | 2/2010 | Csurka et al. ................ 382/170 |
| 2010/0080472 | A1* | 4/2010 | Asano .......................... 382/233 |
| 2010/0191722 | A1* | 7/2010 | Boiman et al. ............... 707/723 |
| 2010/0272357 | A1 | 10/2010 | Maxwell et al. |
| 2011/0035035 | A1 | 2/2011 | Khan et al. |
| 2011/0158533 | A1* | 6/2011 | Gutelzon et al. ............. 382/176 |
| 2011/0202528 | A1 | 8/2011 | Deolalikar et al. |
| 2011/0280453 | A1 | 11/2011 | Chen et al. |
| 2011/0286628 | A1* | 11/2011 | Goncalves et al. ........... 382/103 |
| 2011/0297369 | A1 | 12/2011 | Kumaran et al. |
| 2011/0311129 | A1* | 12/2011 | Milanfar et al. .............. 382/154 |
| 2012/0020546 | A1 | 1/2012 | Inoue et al. |
| 2012/0045134 | A1* | 2/2012 | Perronnin et al. ............ 382/197 |
| 2012/0099796 | A1* | 4/2012 | Zitnick, III .................. 382/199 |
| 2012/0141044 | A1* | 6/2012 | Kwatra et al. ................ 382/274 |
| 2012/0281923 | A1* | 11/2012 | Irani et al. .................... 382/218 |
| 2013/0051685 | A1* | 2/2013 | Shechtman et al. .......... 382/218 |
| 2013/0182909 | A1* | 7/2013 | Rodriguez-Serrano ....... 382/105 |

OTHER PUBLICATIONS

Deselaers, T. et al., "Features for Image Retrieval: An Experimental Comparison", 2008, Information Retrieval, vol. 11, No. 2, p. 1-22.*

Idrissi, K. et al., "Multi-component Cross Entropy Segmentation for Color Image Retrieval", 2001, Image and Signal Processing and Analysis, p. 132-137.*

Oliva, A. and Torralba, A. "Building the Gist of a Scene: The Role of Global Image Features in Recognition", 2006, booktitle=Progress in Brain Research, p. 1-19.*

Yang, J. et al., "Evaluating Bag-of-Visual-Words Representations in Scene Classification", 2007, MIR, p. 197-206.*

Atta, R. et al., "Content-Based Image Retrieval—Approaches and Trends of the New Age", 2005, MIR, p. 1-10.*

Smeulders, A. et al. "Content-Based Image Retrieval at the End of the Early Years", 2000, IEEE Transactions on Pattern Analysis and Machine Intelligence, vol. 22 No. 12. p. 1349-1380.*

Deselaers, T and Muller, H, "Content-based Image Retrieval, Tutorial Image Retrieval", 2008, Tutorial ICPR, p. 1-66.*

Raoui, Y. et al., "Global and Local Image Descriptors for Content Based Image Retrieval and Object Recognition", 2010, Applied Mathematical Sciences, vol. 5, 2011, No. 42, 2109-2136.*

Ke, Y. et al, "Efficient Near-duplicate Detection and Sub-image Retrieval", 2004, ACM Multimedia, p. 1-9.*

Bouveyron, Charles et al., "Dimension Reduction and Classification Methods for Object Recognition in Vision", 2004, 5th French-Danish Workshop on Spatial Statistics and Image Analysis in Biology, p. 1-4.*

"Iteratively reweighted least squares," Wikipedia, Last Modified Jun. 23, 2009, 2 pages, [online] [Retrieved on Jul. 14, 2009] Retrieved from the internet <URL:http://en.wikipedia.org/wiki/Iteratively_reweighted_least_squares>.

Boiman, O., et al., In defense of nearest-neighbor based image classification, IEEE Conference on Computer Vision and Pattern Recognition, Jun. 23-28, 2008, pp. 1-8.

Dai, S., et al., "Soft edge smoothness prior for alpha channel super resolution," IEEE Conference on Computer Vision and Pattern Recognition, 2007, 8 pages.

Efros, A., et al., "Image quilting for texture synthesis and transfer," Computer Graphics Annual Conference (SIGGRAPH 2001); Los Angeles, CA; United States; Aug. 12-17, 2001. pp. 341-346.

Efros, A., et al., "Texture Synthesis by Non-parametric Sampling," 7th IEEE International Conference on Computer Vision, Sep. 20-27, 1999, 10 Pages.

Elad, M., et al., "Restoration of single super-resolution image from several blurred, noisy and down-sampled measured images," IEEE Transactions on Image Processing, Dec. 1997, pp. 1646-1658, vol. 6, No. 12.

Elkan, C., Using the triangle inequality to accelerate k-means, Proceedings of the Twentieth International Conference on Machine Learning (ICML-2003), Washington DC, 2003, 7 pages.

Farsiu, S., et al., "Fast and robust multiframe super resolution," IEEE Transactions on Image Processing, Oct. 2004, pp. 1327-1344, vol. 13, Is. 10.

Finlayson, G.D., et al., Removing shadows from images, ECCV 2002: European Conference on Computer Vision, 2002, 14 pages.

Freeman, W.T., et al., "Example-based super resolution," IEEE Computer Graphics and Applications, 2002, 14 pages.

Grauman, K., et al., "Approximate correspondence in high dimensions," In NIPS, 2006, 8 pages.

(56) References Cited

OTHER PUBLICATIONS

Han, J., et al., "Fast example-based surface texture synthesis via discrete optimization," The Visual Computer, 2006, pp. 918-925, vol. 22.
Hays, J., et al., "Scene completion using millions of photographs," ACM Transactions on Graphics GRAPH, 2007, vol. 26, No. 3.
Irani, M., et al., "Motion analysis for image enhancement: Resolution, occlusion and transparency," Journal of Visual Communication and Image Representation, 1993, 24 pages.
Korah, T., et al., "Analysis of building textures for reconstructing partially occluded facades," European Conference on Computer Vision, 2008, 14 pages.
Kumar, N., et al., "What is a good nearest neighbors algorithm for finding similar patches in images," ECCV, 2008.
Kwatra, V., et al., "Graphcut textures: Images and video synthesis using graph cuts," ACM Transactions on Graphics, Jul. 2003, pp. 277-286, vol. 22, No. 3.
Kwatra, V., et al, "Texture optimization for example-based synthesis," ACM Transactions on Graphics, SIGGRAPH, 2005, pp. 795-802, vol. 24, No. 3.
Lefebvre, S., et al., "Parallel controllable texture synthesis," ACM SIGGRAPH, 2005, pp. 777-786.
Liu, F., "Texture-consistent shadow removal," ECCV. 2008.
Mohan, A., et al., "Editing soft shadows in a digital photograph," IEEE Computer Graphics and Applications, 2007, pp. 23-31, vol. 27, No. 2.
Muller, P., et al., "Image -based procedural modeling of facades," ACM Transactions on Graphics, Jul. 2007, pp. 85-1 to 85-10, vol. 26, No. 3.
Park, M., et al., "Deformed Lattice Detection via Mean-Shift Belief Propagation," European Conference on Computer Vision (ECCV), Oct. 2008, pp. 474-485.
Pauly, M., et al., "Discovering structural regularity in 3rd geometry," ACM Transactions on Graphics, 2008, 11 Pages.
Salvador, E., et al., "Cast shadow segmentation using invariant color features, Computer vision and image understanding," Computer Vision and Image Understanding, 2004, pp. 238-259, vol. 95.
Schindler, G., et al. "Detecting and matching repeated patterns for automatic geo-tagging in urban environments," Computer Vision and Pattern Recognition, CVPR, 2008, pp. 1-7.
Shotton, J., et al., "Semantic texton forest for image categorization and segmentation," Computer Vision and Pattern Recognition, CVPR, 2008, pp. 1-8.
Sun, J., et al., "Image hallucination with primal sketch priors," Computer Vision and Pattern Recognition, 2003, 8 pages.
Torralba, A., et al., "Context-based vision system for place and object recognition," Proceedings. Ninth IEEE International Conference, Oct. 13-16, 2003, pp. 273-380, vol. 1.
Vazquez, E., et al., "Image segmentation in the presence of shadows and highlights," Computer Vision—ECCV, 2008, 14 pages.
Wang, Q., et al., "Patch based blind image super resolution," ICCV 2005. Tenth IEEE International Conference, Oct. 17-21, 2005, pp. 709-716, vol. 1.
Wang, H., et al., "Factoring repeated content within and among images," International Conference on Computer Graphics and Interactive Techniques, ACM SIGGRAPH 2008, 10 pages.
Wu, T., et al., "Natural shadow matting, "ACM Transactions on Graphics, Jun. 2009, Pages , vol. 26, Issue 2, Article 8.
Zhao, T., et al., "Segmentation and tracking of multiple humans in complex situations," CVPR, 2001, 8 Pages.
Cao, G., et al., "Covariance estimation for high dimensional data vectors using the sparse matrix transform," In Daphne Koller, Dale Schuurmans, Yoshua Bengio, and Lon Bottou, editors, NIPS, pp. 225-232. MIT Press, 2008.
Higham, N.J., "Computing the nearest correlation matrix a problem from finance," IMA Journal of Numerical Analysis, 22(3):329-343, 2002.
Jain, A. K., et al., "Statistical pattern recognition: A review," IEEE Transactions on Pattern Analysis and Machine Intelligence, 22(1):4-37, 2000.
Porikli, W. F., et al., "Fast construction of covariance matrices for arbitrary size image windows," In Proc. Intl. Conf. on Image Processing, pp. 1581-1584, 2006.
Qi, J., et al., "Fast computation of the covariance of map reconstructions of pet images," vol. 3661, pp. 344-355, 1999.
Stein, C., et al., "Improving the usual estimator of a normal covariance matrix," Dept. of Statistics, Stanford University, Report 37, 1972.
Baker S., et al., "Limits on Super-Resolution and How to Break Them," IEEE Transactions on Pattern Analysis and Machine Intelligence, 2002, pp. 1-37, vol. 24, No. 9.
Kim, K.I., et al., "Example-Based Learning for Single-Image Super-Resolution," DAGM, 2008, LNCS 5096, pp. 456-465.
Li, X., et al., "Example-based image super-resolution with class-specific predictors," J. Vis. Commun. Image R. 20, 2009, pp. 312-322.
Liang, L., et al., "Real-Time Texture Synthesis by Patch-Based Sampling," ACM Transactions on Graphics, Jul. 2001, pp. 127-150, vol. 20, No. 3.
Qiu, G., "Interresolution Look-up Table for Improved Spatial Magnification of Image," Journal of Visual Communication and Image Representation, 2000, pp. 360-373, vol. 11.

\* cited by examiner

LARGE SCALE PATCH SEARCH

CROSS REFERENCE TO RELATED APPLICATIONS

The application is related to U.S. patent application Ser. No. 12/430,812, filed on Apr. 27, 2009, which is hereby incorporated herein by reference.

BACKGROUND

1. Field of Art

The present invention generally relates to the field of digital imaging, and more specifically, to methods of enhancing digital images.

2. Background of the Invention

Many current information systems store large quantities of digital images, such as map applications providing views of the surrounding area for a given map location. However, many of the images have regions of low resolution or regions with missing data, resulting in a low-quality viewing experience for users of the systems.

For example, some map systems contain numerous representations of large objects, such as 3-D models of buildings. These objects are displayed using textures obtained from aerial and/or ground photographs. These photographs are often obtained from long distances, and therefore can be of relatively low quality. The images may have low spatial resolution, have shadows or occlusions, or contain other artifacts that result in a sub-optimal user experience.

SUMMARY

The problems described above are addressed by a method, computer-readable storage medium and computer system for enhancing the digital images using image data from other images. An embodiment of the method generates global descriptors describing a plurality of received images and patch descriptors describing patches within the received images. The method generates one or more searchable data structures for the received images responsive to the global descriptors and the patch descriptors. The method generates a global descriptor describing an original image and a patch descriptor describing a patch of the original image for which enhancement is desired. The method searches, using the global descriptor describing the original image and the patch descriptor describing the patch of the original image, the one or more searchable data structures. The method identifies, responsive to the search, a set of patches within the received images suitable for enhancing the patch of the original image. The method stores the set of patches suitable for enhancing the patch of the original image.

Embodiments of the computer-readable storage medium and computer system comprise computer program instructions for generating global descriptors describing a plurality of received images and patch descriptors describing patches within the received images and generating one or more searchable data structures for the received images responsive to the global descriptors and the patch descriptors. The instructions further comprise generating a global descriptor describing an original image and a patch descriptor describing a patch of the original image for which enhancement is desired. The instructions also search, using the global descriptor describing the original image and the patch descriptor describing the patch of the original image, the one or more searchable data structures, identify, responsive to the search, a set of patches within the received images suitable for enhancing the patch of the original image and store the set of patches suitable for enhancing the patch of the original image.

An embodiment of the method comprises segmenting a plurality of received images based on texture to form a plurality of received image texture segments. The method generates a plurality of texture descriptors describing the plurality of received texture image segments. The method generates a searchable data structure for the received images responsive to the plurality of texture descriptors. The method segments the original image based on texture to form a plurality of original image texture segments. The method searches, using the original image texture segments, the searchable data structure to identify one or more received image texture segments related to the original image texture segments. The method identifies, responsive to the search, a set of patches within received images having image texture segments related to the original image texture segments suitable for enhancing a patch of the original image. The method stores the set of patches suitable for enhancing the patch of the original image.

The figures depict embodiments of the present invention for purposes of illustration only. One skilled in the art will readily recognize from the following description that alternative embodiments of the structures and methods illustrated herein may be employed without departing from the principles of the invention described herein.

DETAILED DESCRIPTION

Figure 1:
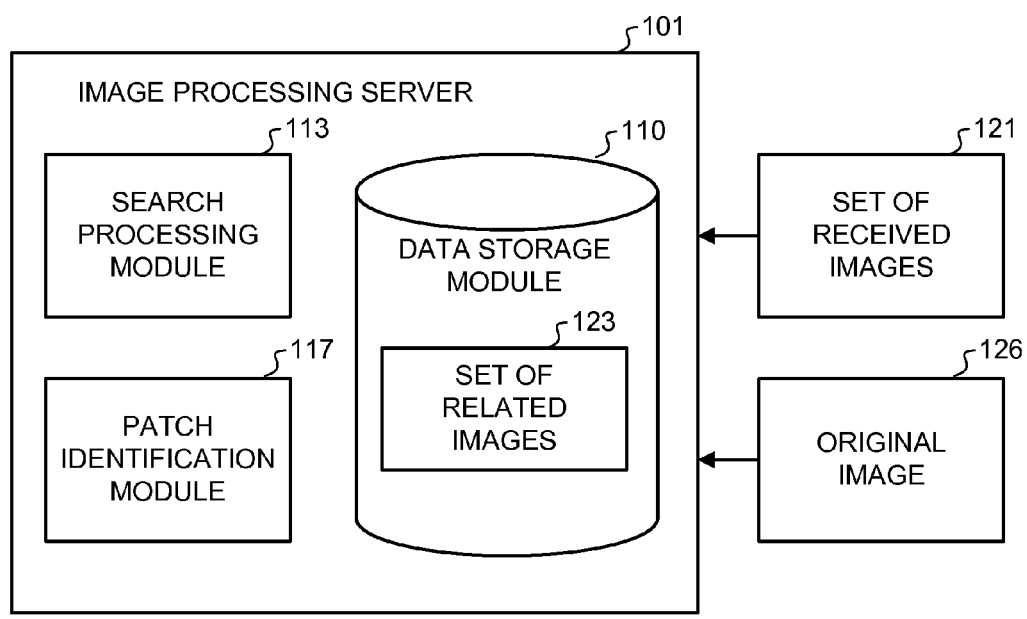
FIG. 1 is a high-level block diagram of an image processing server in accordance with one embodiment of the present invention.

FIG. 1 is a high-level block diagram of an image processing server 101 in accordance with one embodiment of the present invention. The image processing server 101 receives a set of images 121. In general, the received images are of a relatively high-quality and can show a wide variety of scenes. For example, the set of images 121 can include images of building façades, plants, sky, water and the like. These images can be obtained from a variety of sources, such as from an organization producing aerial or street view images of metropolitan areas. Likewise, the images in the set 121 may be obtained from the general public, e.g. images submitted by users to a photo repository such as PICASA WEB, or a video repository such as YOUTUBE or GOOGLE VIDEO. The image processing server 101 processes the set of received images 121 to produce data structures that allow rapid searching of the images and patches (i.e., regions of pixels) within the images.

The image processing server 101 also receives an original image 126. The original image, like the images in the received set 121, can show buildings, plants, etc. Generally speaking, the original image 126 includes one or more patches that are of relatively low quality. For example, a patch in the original image 126 can have low spatial resolution, contain an occlusion, or suffer from other defects.

The image processing server 101 can enhance the original image 126 by identifying one or more higher-quality patches from the set of related images 121 that can replace a lower-quality patch in the original image. To find a replacement patch for the original image 126, the image processing server 101 searches the data structures to identify, from the received images 121, a set of related images 123 that are visually similar to the original image and a set of patches from those images that are similar to the patch to be replaced.

In one embodiment, the image processing server 101 comprises a data storage module 110, a search processing module 113 and a patch identification module 117. The data storage module 110 stores data used by the image processing server 101. In one embodiment, these data include the set of received images 121, the set of related images 123, a set of patches in the received images 121 and related images 123 (and/or descriptions of the patches), the original image 126 and various data structures associated with the set of received images 121 and the related images 123.

The search processing module 113 receives the set of images 121 and processes it to allow fast searching of the images and patches within the images. In one embodiment, the search processing module 113 generates global descriptors for the images in the set of received images 121. The global descriptors are low dimensional representations of the features of the images. The search processing module 113 organizes the set of received images 121 into an image data structure based on the global descriptors. The image data structure is stored in the data storage module 110.

The search processing module 113 also processes the set of received images 121 to identify a set of patches for each image in the set 121. The search processing module 113 generates patch descriptors that describe features of the patches. The search processing module 113 organizes the patches of an image into a patch data structure based on the patch descriptors. Thus, the search processing module 113 creates one patch data structure for each image in the set 121. The patch data structures are stored in the data storage module 110.

The patch identification module 117 receives the original image 126 and enhances it by identifying a set of higher-quality patches in the set of received images 121 that can replace a lower-quality patch in the original image 126. The patch identification module 117 generates a global descriptor for the original image 126 using the same one or more techniques applied to the set of received images 121. The patch identification module 117 identifies the patch in the original image 126 for which enhancement is desired and determines a descriptor for this patch using the same technique applied to the patches of the received images 121. The patch identification module 117 searches the image data structure using the global descriptor for the original image 126 to identify a set of related (i.e., visually similar) images 123. The patch identification module 117 uses the patch descriptor to search the patch data structures for the related images 123 to identify a set of patches of the related images 123. The patches in the set of patches are visually similar to the patch of the original image 126 for which enhancement is desired. The patch identification module 117 can save the set of patches to the data storage module 110. The image processing server 101 can then select among the set of patches to identify a patch for enhancing the original image 126. Further details are provided in application Ser. No. 12/430,812.

Figure 2:
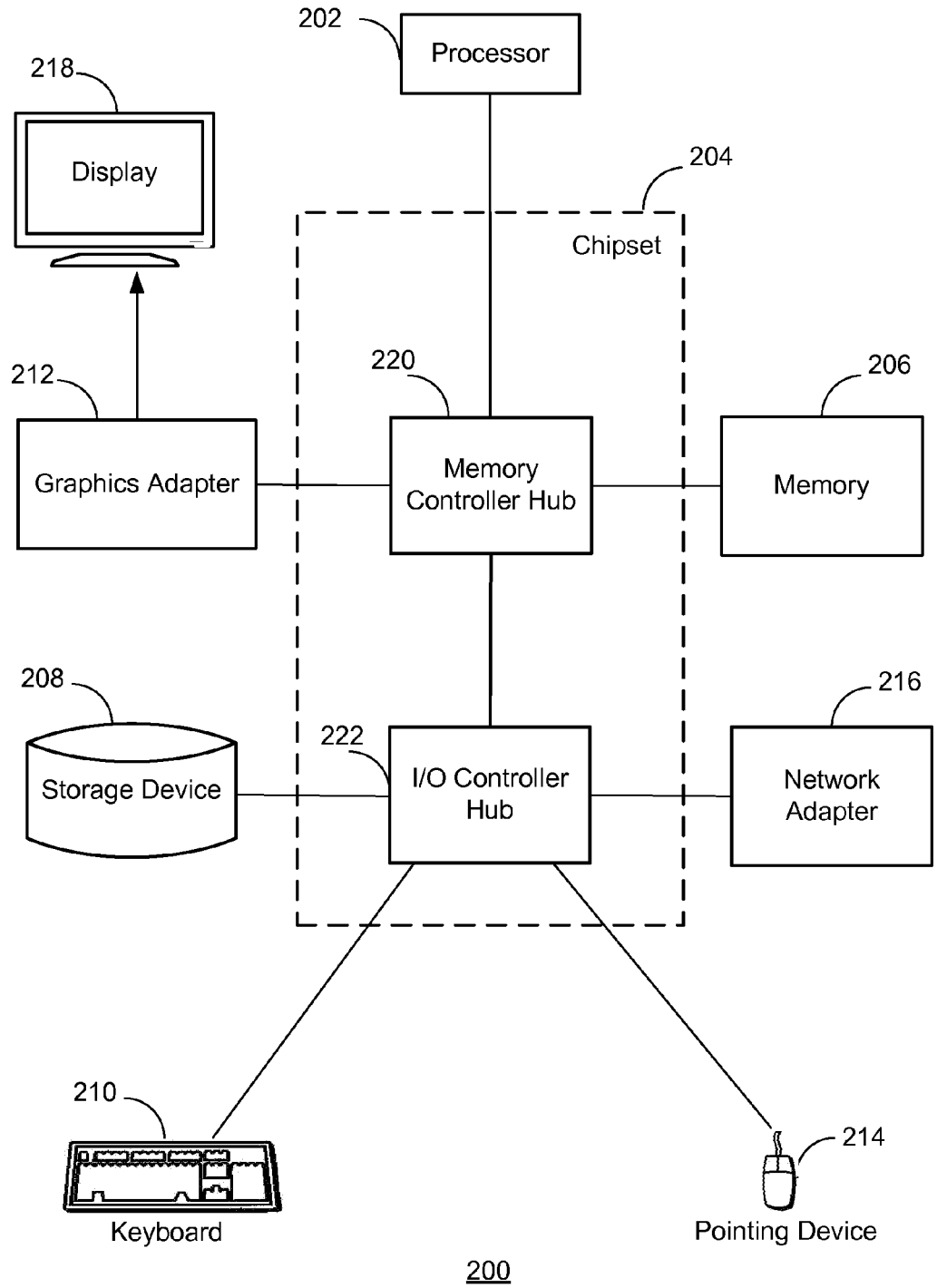
FIG. 2 is a high-level block diagram illustrating an example of a computer for use as an image processing server according to one embodiment.

FIG. 2 is a high-level block diagram illustrating an example of a computer 200 for use as an image processing server 101. Illustrated are at least one processor 202 coupled to a chipset 204. The chipset 204 includes a memory controller hub 220 and an input/output (I/O) controller hub 222. A memory 206 and a graphics adapter 212 are coupled to the memory controller hub 220, and a display device 218 is coupled to the graphics adapter 212. A storage device 208, keyboard 210, pointing device 214, and network adapter 216 are coupled to the I/O controller hub 222. Other embodiments of the computer 200 have different architectures. For example, the memory 206 is directly coupled to the processor 202 in some embodiments.

The storage device 208 is a computer-readable storage medium such as a hard drive, compact disk read-only memory (CD-ROM), DVD, or a solid-state memory device. The memory 206 holds instructions and data used by the processor 202. The pointing device 214 is a mouse, track ball, or other type of pointing device, and is used in combination with the keyboard 210 to input data into the computer system 200. The graphics adapter 212 displays images and other information on the display device 218. The network adapter 216 couples the computer system 200 to the network 140. Some embodiments of the computer 200 have different and/or other components than those shown in FIG. 2.

The computer 200 is adapted to execute computer program modules for providing functionality described herein. As used herein, the term "module" refers to computer program instructions and other logic used to provide the specified functionality. Thus, a module can be implemented in hardware, firmware, and/or software. In one embodiment, program modules formed of executable computer program instructions are stored on the storage device 208, loaded into the memory 206, and executed by the processor 202.

The type of computer 200 used as the image processing server 101 can vary depending upon the embodiment and the required processing power. For example, the image processing server 101 may comprise multiple blade servers working together to provide the functionality described herein and lack certain elements, such as a display and keyboard.

Figure 3:
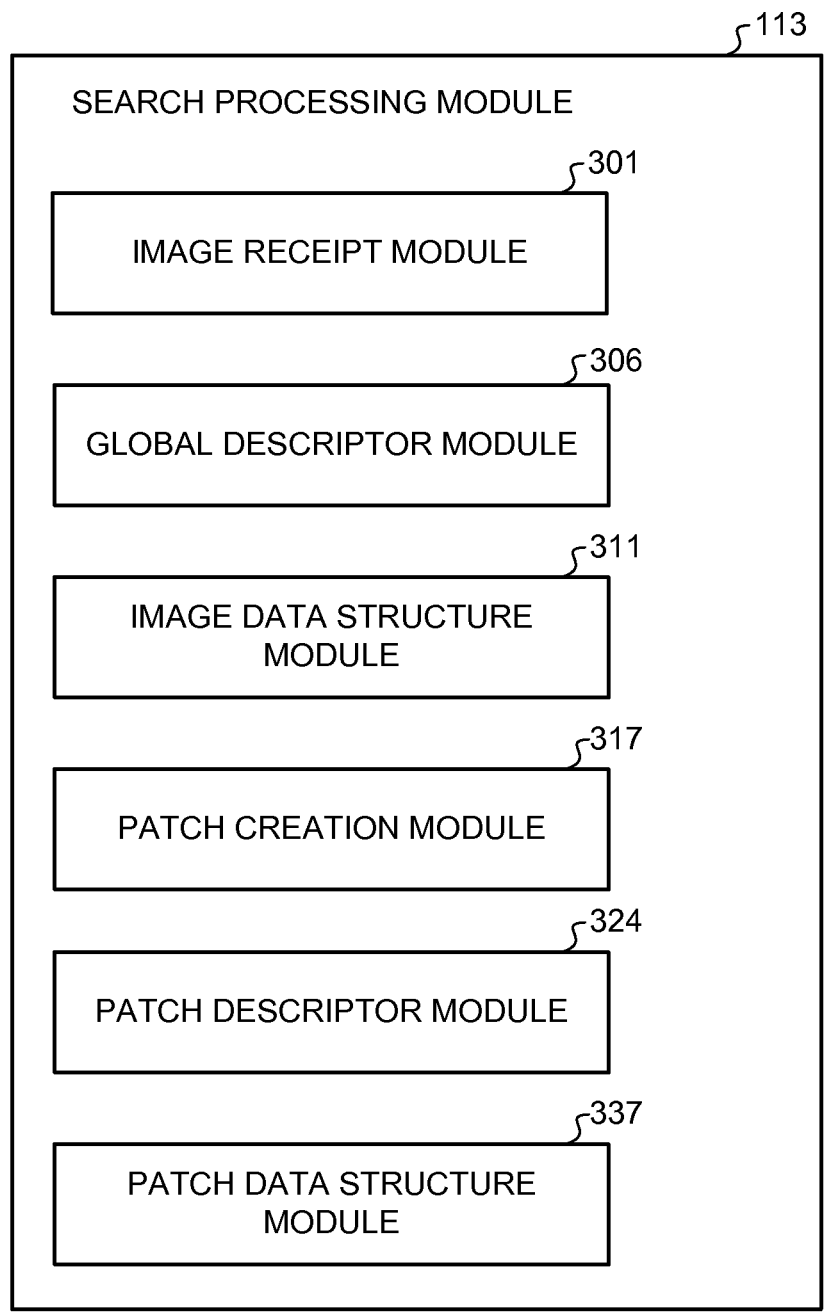
FIG. 3 is a high-level block diagram illustrating modules within a search processing module.

FIG. 3 is a high-level block diagram illustrating modules within the search processing module 113 according to one embodiment. Some embodiments of the search processing module 113 have different and/or additional modules than the ones described here. Similarly, the functions can be distributed among the modules in a different manner than is described here. Certain modules and functions can be incorporated into other modules of the search processing module 113 or image processing server 101.

An image receipt module 301 receives the set of images 121 and saves the images to the data storage module 110.

A global descriptor module 306 generates global descriptors for the set of received images 121. In general, the global descriptor module 306 generates a global descriptor for each image in the set 121. The global descriptor is a low dimensional representation of the features of the image. Suitable global descriptors that the global descriptor module 306 can generate include descriptors made using the "gist" algorithm described in Oliva, A., and Torralba, A. 2006, "Building the gist of a scene: The role of global image features in recognition." Visual Perception, Progress in Brain Research, vol. 155. Other embodiments can generate global descriptors using different techniques. For example, other embodiments can use descriptors with masks to deal with parts of images having artifacts such as occlusion, shadow or low resolution.

An image data structure module 311 organizes the set of received images 121 into a searchable image data structure based on the images' 121 global descriptors. In one embodiment, the image data structure is a tree structure, such as a tree produced through Hierarchical K-means clustering of the descriptors. This type of tree-based data structure represents the semantic structure of all the images 121. Images having similar global descriptors are grouped closer together within the structure. Thus, if the set of received images 121 includes different scenes of buildings, mountains and waterfronts, the images having scenes of different buildings will be grouped together in the image data structure because they will have similar descriptors. The same will be true of the images having scenes of different waterfronts and the images having scenes of different mountains. Other embodiments can organize the images into other data structures.

In one embodiment, the image data structure module 311 builds the image data structure to represent semantic structure of all the images. In one embodiment, the image data structure module 311 stores the image data structure for the received images 121 to the data storage module 110.

A patch creation module 317 creates patches from the received images 121. In one embodiment, the patch creation module 317 creates a separate set of patches for each received image 121. The patch creation module 317 creates the patches for an image by applying a sliding window across the image and recognizing each window of pixels as a separate patch. In one embodiment, each patch is offset by one pixel from its adjacent patches. Thus, the patches in the set of patches can overlap. In another embodiment, different patches in the set contain completely different pixels and/or different pixel data, i.e., the different patches in the set of patches do not overlap. In one embodiment, the dimensions of the sliding window are 32×32 pixels. Thus, each patch contains a total of 1,024 pixels. Other embodiments can create different sized patches.

In one embodiment, the patch creation module 317 stores the set of patches to the data storage module 110. Alternatively, the patch creation module 317 can store data describing the patches, such as identifiers of the patches and references to the pixels within the corresponding received image that constitute the patch.

A patch descriptor module 324 generates descriptors that describe the patches. In one embodiment, the patch descriptor module 324 generates a descriptor for each patch created by the patch creation module 317. The descriptor can be a feature vector describing the pixels in the patch. For example, the patch descriptor module 324 can create a feature vector describing the intensities of the 1024 pixels within the patch. In one embodiment, the patch descriptor module 324 reduces the dimensions of the descriptor in order to improve processing efficiency. This reduction is performed by applying a dimensionality reduction algorithm, such as principal component analysis (PCA), to the descriptor. In one embodiment, the patch descriptor module 324 generates patch descriptors using the "gist" algorithm or a Gabor filter.

A patch data structure module 337 organizes the patches for an image into a searchable patch data structure based on the patches' descriptors. In one embodiment, the patch data structure is a tree structure, such as a tree produced through Hierarchical K-means clustering of the patch descriptors like that of the image data structure. In one embodiment, the patch data structure module 337 stores the patch data structures to the data storage module 110.

In one embodiment, the patch creation module 317 creates a set of patches for the set of related images 123 (e.g., instead of the patch creation module 317 creating patches for each of the received images 121). The patch creation module 317 then stores the set of patches to the data storage module 110. The patch data structure module 337 organizes the patches for the related images 123 into one or more searchable patch data structures based on the patches' descriptors for the related images 123. The patch data structure module 337 stores the patch data structure to the data storage module 110.

Figure 4:
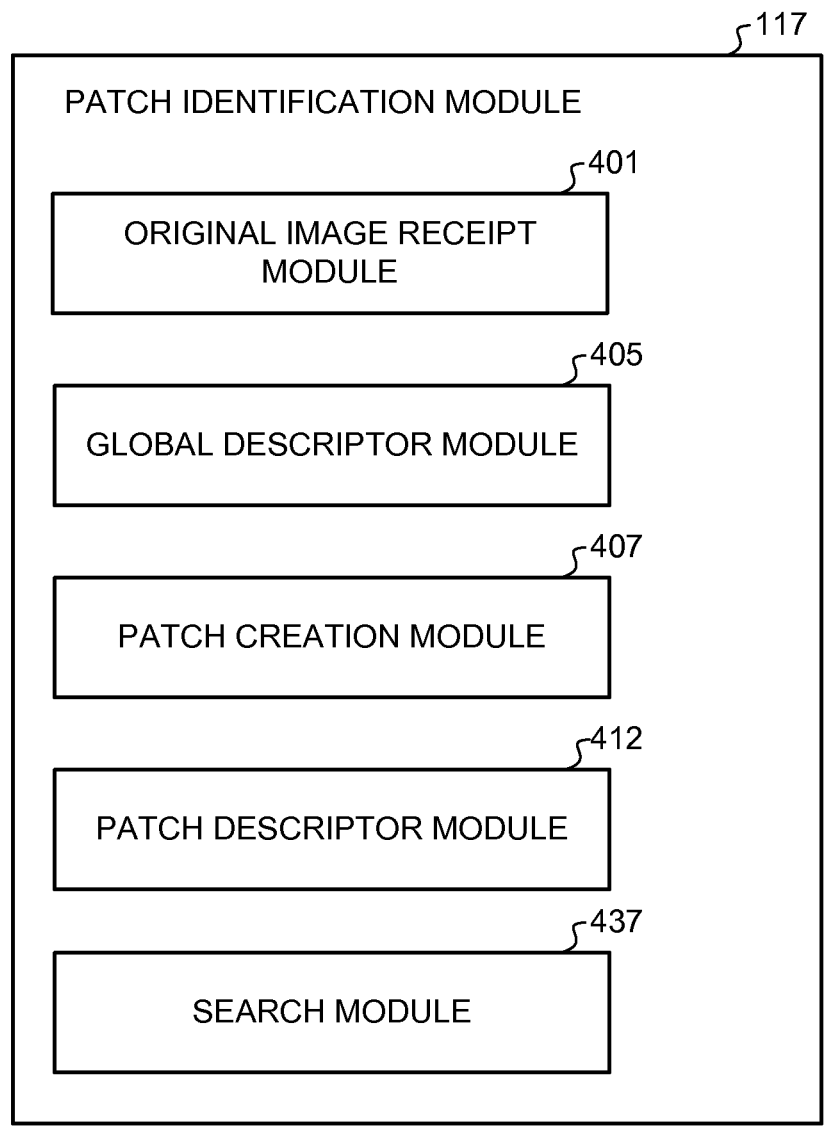
FIG. 4 is a high-level block diagram illustrating modules within a patch identification module.

FIG. 4 is a high-level block diagram illustrating modules within the patch identification module 117 according to one embodiment. Some embodiments of patch identification module 117 have different and/or additional modules than the ones described here. Similarly, the functions can be distributed among the modules in a different manner than is described here. Certain modules and functions can be incorporated into other modules of the patch identification module 117 or image processing server 101.

Many of the modules of the patch identification module 117 have the same or similar function to corresponding modules of the search processing module 113 show in FIG. 3. Thus, like names have been used to refer to like modules with the same or similar functionality. For example, like the search processing modules 113, the patch identification module 117 also includes: a global descriptor module 405; a patch creation module 407; and a patch descriptor module 412.

An original image receipt module 401 receives the original image 126 and saves it to the data storage module 110.

The global descriptor module 405 generates a global descriptor for the original image 126. In one embodiment, the global descriptor for the original image 126 is generated in the same manner as the global descriptors for the set of received images 121. For example, if the search processing module 113 uses the "gist" algorithm for the received images 121, then the patch identification module 117 uses the same algorithm on the original image 126.

The patch creation module 407 creates (i.e., identifies) a patch in the original image 126. In one embodiment, the patch in the original image 126 comprises a region of the original image for which patch identification is desired, such as a region of low resolution and/or a region of pixels having an artifact such as an occlusion. In one embodiment, the patch in the original image 126 is identified based on input received from a human user of the image processing server 101.

The patch descriptor module 412 creates a patch descriptor for the identified patch in the original image 126. In one embodiment, the descriptor type used for the patch in the original image 126 is the same as was used for the set of patches in the received images 121.

The search module 437 receives the global descriptor and the patch descriptor for the original image 126 and uses the descriptors to search for similar images 123 and patches from the set of received images 121. In one embodiment, the search module 437 searches the image data structure to identify a set of related images 123 that have global descriptors similar to that of the original image 126 using a tree-based Nearest Neighbor Search ("NNS") technique, including any variant and/or derivative thereof.

In one embodiment, the search module 437 identifies the set of related images 123 by searching the image data structure for global descriptors that are similar to the global descriptor for the original image 126. For example, the search module 437 can search the image data structure for global descriptors that are within a predetermined amount of similarity with the global descriptor of the original image. The amounts of similarity can be measured by determining the distances between global descriptors for the received images 121 and the original image descriptor. Distance can be measured using Euclidian distance, Manhattan distance and/or any variant thereof. To this end, the search module 437 can quickly traverse the nodes of the image data structure tree to identify nodes for global descriptors similar to that of the original image 126, and then identify descriptors at those nodes that are within a predetermined distance from the original image descriptor. The received images corresponding to the descriptors within the threshold form the set of related images 123.

The search module 437 then identifies a set of patches within the related images 123 that are similar to the patch in the original image 126 for which enhancement is desired. To this end, the search module 437 searches the patch data structures for the related images 123 using the patch descriptor for the original image 126. This search can be performed using NNS and/or other techniques. The result of this search is a set of one or more patches from the related images 123 that are visually similar to the patch in the original image 126. The search module 437 then outputs the set of similar patches. The desired number of patches in the output set may be specified as input to the search module 437, and may designate either a number of patches for each related image 123, or a total number of patches across all the related images 123.

In one embodiment, the search module 437 stores the output set of patches to the data storage module 110. One or more of these patches can then be used to enhance the original image 126 by replacing the patch in the original image with a higher-quality patch for the output set of patches.

In an alternative embodiment, the image processing server 101 segments the received images 121 using a texture-based segmentation algorithm. Different segments can have different textures. The global descriptor module 306 generates global descriptors for the segments. The global descriptor can be, for example, a feature vector describing the texture contained within the segment. The image data structure module 311 then organizes the global descriptors into a tree-based data structure such as the tree based on Hierarchical K-means clustering described above.

The image processing server 101 then segments the original image 126 into segments using the same texture-based segmentation algorithm used for the received images 121. Instead of identifying a set of related images 123, the search module 437 identifies, from the segments of the received images 121, one or more sets of related segments that are visually similar to the segments from the original image 126. To find the related segments, the image processing server 101 generates global descriptors for the segments from the original image 126 and then compares these segments to the tree-based structure for the received images 121 to identify one or more sets of related segments from the received images 121.

For example, the search module 437 uses an NNS-based search technique to identify a set of segments from the received images 121 that are visually similar to a particular segment from the original image 126. Segments from the received images 121 having global descriptors within a predetermined distance of the global descriptor for the segment from the original image 126 form a set of related segments. This process is repeated for each of the segments from the original image 126 to form one or more sets of related segments. In one embodiment, the sets of related segments are then stored to the data storage module 110.

The patch creation module 407 identifies a patch in the non-segmented version of the original image 126 and the patch descriptor module 412 generates a patch descriptor for this patch, as previously described.

The search module 437 then identifies a set of similar patches for the non-segmented version of the original image 126 by searching the patch data structures for a subset of the received images 121. In one embodiment, the search module 437 searches the patch data structures for all the received images 121 having a segment in the set of related segments. In another embodiment, the search module 437 searches the patch data structures for all the received images 121 having a threshold number of segments in the set of related segments. The threshold can be specified by a human user of the image processing server 101. This search can be performed using NNS and/or other techniques. In one embodiment, the set of patches are then stored to the data storage module 110.

In one embodiment, instead of identifying patches for the original image 126, the search module 437 identifies a set of replacement texture segments that are similar to a portion of the original image 126 for which image enhancement is desired. A portion of the original image 126 is a subset of pixels from the original image 126, including, e.g., a patch or a segment from the original image 126. The patch creation module 407 and patch descriptor module 412 can be modified to identify different portions of the original image 126 for which enhancement is desired and generate descriptors for these portions ("portion descriptors"). Thus, as an example of identifying a set of replacement texture segments, the search module 437 identifies, from among the set of related segments, one or more texture segments that are within a predetermined distance of a descriptor for a portion of the original image 126 that is to be enhanced. The texture segments within the predetermined distance threshold are identified by the search module 437 as forming the set of replacement texture segments. In one embodiment, the set of replacement texture segments is stored to the data storage module 110.

In one embodiment, the image processing server 101 ranks the received images 121 based on the sets of related segments and the search module 437 identifies a set of replacement patches or a set of replacement texture segments based in part on these rankings For example, the image processing server 101 assigns segment similarity scores to the segments forming the sets of related segments. In one embodiment, the segment similarity score for a related segment is based on the distance between the descriptor for the related segment and the original image segment that was previously identified as similar to the related segment. In one embodiment, the segment similarity score is inversely proportional to the distance separating the descriptors for that related segment and that segment's matching original image segment. Thus, smaller distances between these descriptors correspond to a higher segment similarity score.

The image processing server 101 then assigns an image similarity score to each of the received images 121. The image similarity score is assigned by determining which received images 121 have segments in the sets of related segments and then comparing among these images 121 to determine, for each of the received images 121, an image similarity score that is weighted against the other received images 121. In one embodiment, the image similarity score for a particular received image 121 is assigned based on a mathematical combination of the segment similarity scores for all the related segments originating from that received image 121. A mathematical combination of the segment similarity scores can be the sum or the product of the segment similarity scores for all the related segments originating from that received image 121. For example, the image processing server 101 determines which of the related segments originated from a particular received image 121, multiplies all the segment similarity scores for these segments and assigns an image similarity score to the image 121 that is equal to the product of these scores. In another embodiment, individual related segments are not assigned segment similarity scores and the image processing server 101 assigns image similarity scores to the received images 121 based on a count of the related segments originating from the received images 121. For example, the image processing server 101 determines which of the related segments originated from a particular received image 121, counts the number of segments originating from that image 121 and assigns an image similarity score to the image 121 that is equal to (or otherwise based on) the counted number of segments.

The image processing server 101 then ranks the received images 121 based on their respective image similarity scores. In one embodiment, the image processing server 101 ranks each of the received images 121 by decreasing image similarity score.

The search module 437 then searches the patch data structures of higher ranking received images 121 first when identifying a set of replacement patches. Similarly, the search module 437 searches higher ranking received images 121 first if identifying a set of replacement texture segments. Thus, the rankings make it more likely that the set of replacement patches or set of replacement texture segments will come from those received images having higher image similarity scores relative to the other received images. Alternatively, the search module 437 can be configured to identify a set of replacement patches or texture segments from received images 121 having a minimum predetermined image similarity ranking or a minimum predetermined image similarity score. In one embodiment, the rankings, segment and/or image similarity scores, identified sets of replacement patches and/or sets of replacement texture segments are saved to the storage module 110.

Figure 5A:
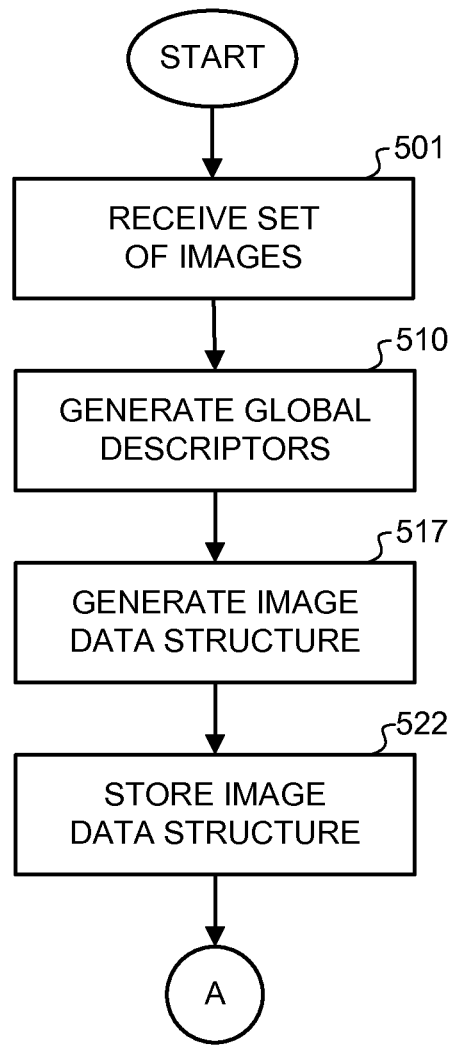
FIGS. 5A and 5B are flowcharts illustrating steps performed by the image processing server to process received images and generate image and patch data structures.
Figure 5B:
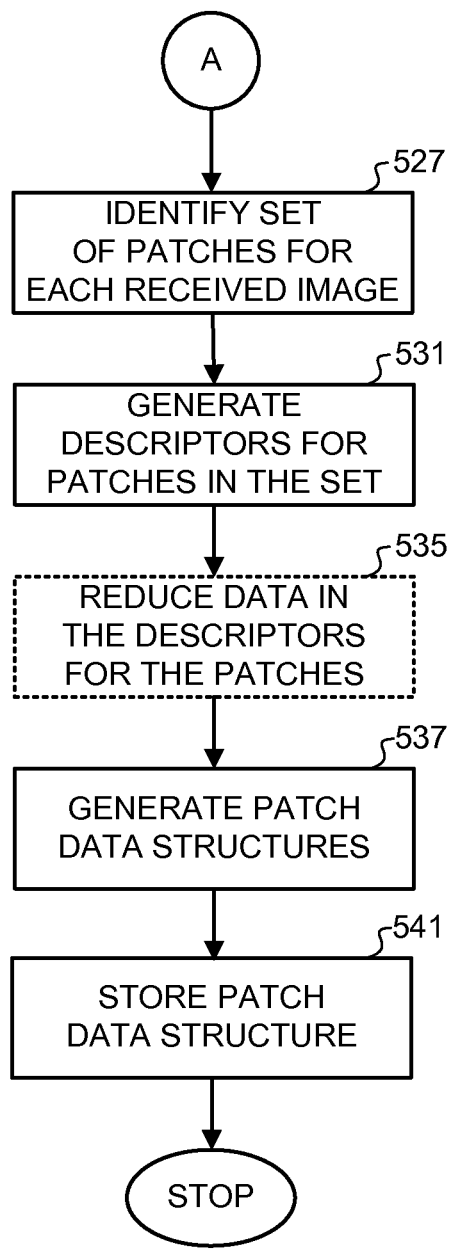

FIGS. 5A and 5B are flowcharts illustrating steps performed by the image processing server 101 to process received images 121 and generate the image and patch data structures according to one embodiment. Other embodiments perform different steps than those shown in the figures and perform the steps in different orders and/or in parallel. In addition, some or all of the steps can be performed by entities other than the image processing server 101.

Referring now to FIG. 5A, the image processing server 101 receives 501 the set of images 121. The image processing server 101 generates 510 global descriptors for the images in the set 121. The image processing server 101 generates 517 a searchable image data structure, such as a Hierarchical K-means tree, for the set of received images 121 based on the global descriptors. The image processing server 101 stores 522 the image data structure to the data storage module 110.

Turning now to FIG. 5B, the image processing server 101 identifies 527 a set of patches for each received image 121. The image processing server 101 generates 531 descriptors for the patches in the set. In one embodiment, the image processing server 101 reduces 535 the dimensionality of the descriptors. The image processing server 101 generates 537 a searchable patch data structure for the patches of each received image 121 based on the descriptors. The image processing server 101 stores 541 the patch data structures to the data storage module 110.

Figure 6:
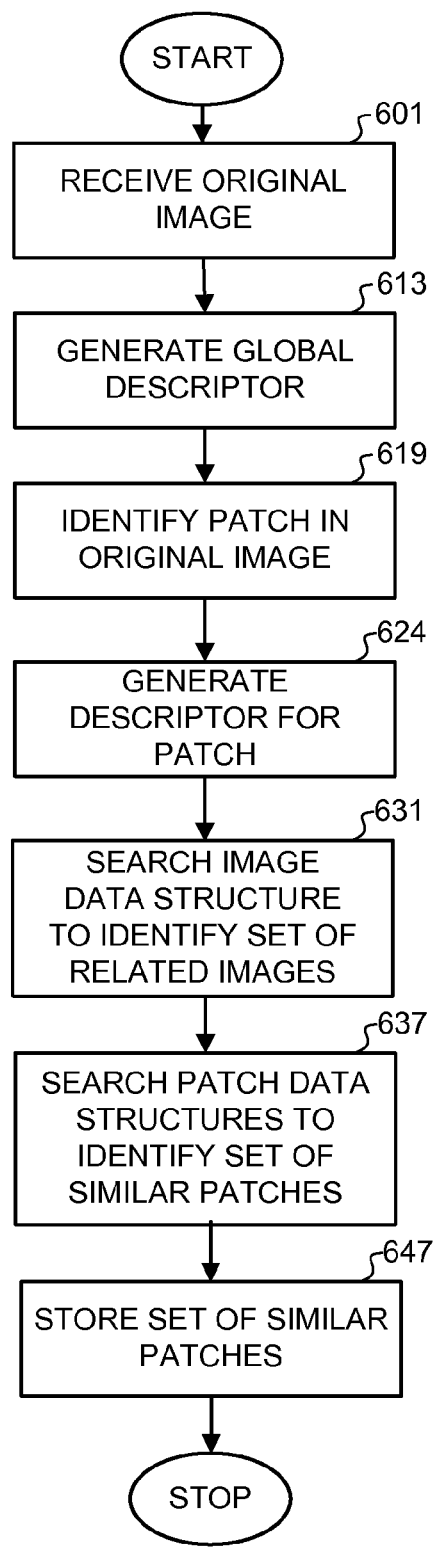
FIG. 6 is a flowchart illustrating steps performed by the image processing server to search the image and patch data structures.

FIG. 6 is a flowchart illustration steps performed by the image processing server 101 to search the image and patch data structures for a replacement patch. Other embodiments perform different steps than those shown in the figures and perform the steps in different orders and/or in parallel. In addition, some or all of the steps can be performed by entities other than the image processing server 101.

Turning now to FIG. 6, the image processing server 101 receives 601 an original image 126. The image processing server 101 generates 613 a global descriptor for the original image 126. The image processing server 101 identifies 619 a patch in the original image 126 for which enhancement is desired. The image processing server 101 generates 624 a descriptor for the identified patch. The image processing server 101 uses the global descriptor of the original image 126 to search 631 the image data structure to identify a set of similar related images 123. The image processing server 101 uses the descriptor of the patch of the original image 126 to search 637 the patch data structures for the related images 123 to identify a set of similar patches. The image processing server 101 stores 647 the set of similar patches. These patches can then be used to enhance the original image 126.

The present invention has been described in particular detail with respect to one possible embodiment. Those of skill in the art will appreciate that the invention may be practiced in other embodiments. First, the particular naming of the components and variables, capitalization of terms, the attributes, data structures, or any other programming or structural aspect is not mandatory or significant, and the mechanisms that implement the invention or its features may have different names, formats, or protocols. Also, the particular division of functionality between the various system components described herein is merely exemplary, and not mandatory; functions performed by a single system component may instead be performed by multiple components, and functions performed by multiple components may instead performed by a single component.

Some portions of above description present the features of the present invention in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of computer-readable storage medium suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the art, along with equivalent variations. In addition, the present invention is not described with reference to any particular programming language. It is appreciated that a variety of programming languages may be used to implement the teachings of the present invention as described herein, and any references to specific languages are provided for invention of enablement and best mode of the present invention.

The present invention is well suited to a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

What is claimed is:

1. A computer-implemented method for identifying patches for enhancing an original image, comprising:
    generating global descriptors describing a plurality of received images and patch descriptors describing patches within the received images, wherein generating patch descriptors describing patches within the received images comprises:
        identifying a set of patches within a received image, wherein each patch is a region of pixels within the received image;
        generating feature vectors for the patches within the set of patches; and
        applying a dimensionality reduction algorithm to the feature vectors to produce the patch descriptors;
    generating one or more searchable data structures for the received images responsive to the global descriptors and the patch descriptors;
    generating a global descriptor describing an original image and a patch descriptor describing a patch of the original image for which enhancement is desired;
    searching, using the global descriptor describing the original image and the patch descriptor describing the patch of the original image, the one or more searchable data structures;
    identifying, responsive to the search, a set of patches within the received images suitable for enhancing the patch of the original image; and
    storing the set of patches suitable for enhancing the patch of the original image.

2. The method of claim 1, wherein generating global descriptors describing a plurality of received images comprises:
    generating low dimensional representations of the plurality of received images.

3. The method of claim 1, wherein generating one or more searchable data structures for the received images comprises:
    generating a tree data structure describing the received images responsive to a Hierarchical K-means clustering of the global descriptors.

4. The method of claim 1, wherein generating one or more searchable data structures for the received images comprises:
    generating a tree data structure describing patches within a received image responsive to a Hierarchical K-means clustering of the patch descriptors describing the patches within the received image.

5. The method of claim 1, wherein the searching comprises:
    searching a data structure of the global descriptors describing the received images to identify global descriptors describing received images that are similar to the global descriptor describing the original image;
    identifying a set of one or more related images from the plurality of received images responsive to the search of the data structures of the global descriptors.

6. The method of claim 2, wherein the identifying comprises:
    identifying a patch data structure for each of the one or more related images, each patch data structure associated with a related image and describing patches within the associated related image;
    searching each identified patch data structure using the patch descriptor describing the patch of the original image to identify the set of patches within the received images suitable for enhancing the patch of the original image.

7. A non-transitory computer-readable storage medium storing executable computer program instructions for enhancing an original image, the computer program instructions comprising instructions for:
    generating global descriptors describing a plurality of received images and patch descriptors describing patches within the received images, wherein the instructions for generating patch descriptors describing patches within the received images comprise instructions for:
        identifying a set of patches within a received image, wherein each patch is a region of pixels within the received image;
        generating feature vectors for the patches within the set of patches; and
        applying a dimensionality reduction algorithm to the feature vectors to produce the patch descriptors;
    generating one or more searchable data structures for the received images responsive to the global descriptors and the patch descriptors;
    generating a global descriptor describing an original image and a patch descriptor describing a patch of the original image for which enhancement is desired;
    searching, using the global descriptor describing the original image and the patch descriptor describing the patch of the original image, the one or more searchable data structures;
    identifying, responsive to the search, a set of patches within the received images suitable for enhancing the patch of the original image; and
    storing the set of patches suitable for enhancing the patch of the original image.

8. The computer-readable storage medium of claim 7, wherein the instructions for generating global descriptors describing a plurality of received images comprise instructions for:

generating low dimensional representations of the plurality of received images.

9. The computer-readable storage medium of claim 7, wherein the instructions for generating one or more searchable data structures for the received images comprise instructions for:
generating a tree data structure describing the received images responsive to a Hierarchical K-means clustering of the global descriptors.

10. The computer-readable storage medium of claim 7, wherein the instructions for generating one or more searchable data structures for the received images comprise instructions for:
generating a tree data structure describing patches within a received image responsive to a Hierarchical K-means clustering of the patch descriptors describing the patches within the received image.

11. The computer-readable storage medium of claim 7, wherein the instructions for searching the one or more searchable data structures comprise instructions for:
searching a data structure of the global descriptors describing the received images to identify global descriptors describing received images that are similar to the global descriptor describing the original image;
identifying a set of one or more related images from the plurality of received images responsive to the search of the data structures of the global descriptors.

12. The computer-readable storage medium of claim 8, wherein the instructions for identifying a set of patches within the received images comprise instructions for:
identifying a patch data structure for each of the one or more related images, each patch data structure associated with a related image and describing patches within the associated related image;
searching each identified patch data structure using the patch descriptor describing the patch of the original image to identify the set of patches within the received images suitable for enhancing the patch of the original image.

13. A computer system for enhancing an original image, comprising:
a non-transitory computer-readable storage medium storing executable computer program instructions comprising instructions for:
generating global descriptors describing a plurality of received images and patch descriptors describing patches within the received images, wherein the instructions for generating patch descriptors describing patches within the received images comprise instructions for:
identifying a set of patches within a received image, wherein each patch is a region of pixels within the received image;
generating feature vectors for the patches within the set of patches; and
applying a dimensionality reduction algorithm to the feature vectors to produce the patch descriptors;
generating one or more searchable data structures for the received images responsive to the global descriptors and the patch descriptors;
generating a global descriptor describing an original image and a patch descriptor describing a patch of the original image for which enhancement is desired;
searching, using the global descriptor describing the original image and the patch descriptor describing the patch of the original image, the one or more searchable data structures;
identifying, responsive to the search, a set of patches within the received images suitable for enhancing the patch of the original image; and
storing the set of patches suitable for enhancing the patch of the original image; and
a processor for executing the computer program instructions.

14. The computer system of claim 13, wherein the instructions for generating global descriptors describing a plurality of received images comprise instructions for:
generating low dimensional representations of the plurality of received images.

15. The computer system of claim 13, wherein the instructions for generating one or more searchable data structures for the received images comprise instructions for:
generating a tree data structure describing the received images responsive to a Hierarchical K-means clustering of the global descriptors.

16. The computer system of claim 13, wherein the instructions for generating one or more searchable data structures for the received images comprise instructions for:
generating a tree data structure describing patches within a received image responsive to a Hierarchical K-means clustering of the patch descriptors describing the patches within the received image.

17. The computer system of claim 13, wherein the instructions for searching the one or more searchable data structures comprise instructions for:
searching a data structure of the global descriptors describing the received images to identify global descriptors describing received images that are similar to the global descriptor describing the original image;
identifying a set of one or more related images from the plurality of received images responsive to the search of the data structures of the global descriptors.

18. The computer system of claim 14, wherein the instructions for identifying a set of patches within the received images comprise instructions for:
identifying a patch data structure for each of the one or more related images, each patch data structure associated with a related image and describing patches within the associated related image;
searching each identified patch data structure using the patch descriptor describing the patch of the original image to identify the set of patches within the received images suitable for enhancing the patch of the original image.

* * * * *